(12) United States Patent
Abe et al.

(10) Patent No.: US 7,196,743 B2
(45) Date of Patent: Mar. 27, 2007

(54) IMAGE DISPLAY APPARATUS HAVING PARTICULAR PHASE DIFFERENCE

(75) Inventors: Masayuki Abe, Tochigi (JP); Atsushi Okuyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 10/922,402

(22) Filed: Aug. 19, 2004

(65) Prior Publication Data

US 2005/0041165 A1    Feb. 24, 2005

(30) Foreign Application Priority Data

Aug. 22, 2003   (JP) .............................. 2003-208413

(51) Int. Cl.
*G02F 1/1335* (2006.01)
(52) U.S. Cl. ............................. 349/5; 349/117; 349/119
(58) Field of Classification Search ................ 349/5–9, 349/117–119
See application file for complete search history.

(56) References Cited

U.S. PATENT DOCUMENTS

| | | | | |
|---|---|---|---|---|
| 5,327,270 A | * | 7/1994 | Miyatake | 349/9 |
| 5,626,409 A | * | 5/1997 | Nakayama et al. | 353/31 |
| 5,760,875 A | * | 6/1998 | Daijogo et al. | 353/31 |
| 6,478,429 B1 | * | 11/2002 | Aritake et al. | 353/31 |
| 6,529,250 B1 | * | 3/2003 | Murakami et al. | 349/5 |
| 6,624,862 B1 | * | 9/2003 | Hayashi et al. | 349/119 |

FOREIGN PATENT DOCUMENTS

JP   2003-121782   4/2003

OTHER PUBLICATIONS

Chinese Office Action of corresponding Chinese Patent Application No. 2004100576099 mailed Nov. 25, 2005 (3 pages) and partial English translation (1 page).

* cited by examiner

*Primary Examiner*—Mike Qi
(74) *Attorney, Agent, or Firm*—Morgan & Finnegan, LLP (57) ABSTRACT

An image display apparatus is disclosed which is capable of obtaining a projected image having high contrast. The image display apparatus includes a luminous flux dividing system dividing light from a light source into a plurality of luminous fluxes and a condensing optical system leading the luminous fluxes emerged from the luminous flux dividing system to a reflective liquid crystal display element. The condensing optical system includes a condenser lens, a field lens making light from the condenser lens substantially telecentric, a polarization beam splitter, and a ¼ phase plate disposed between the polarization beam splitter and the liquid crystal display element. In addition, the phase difference φ that the ¼ phase plate gives to the ray made incident into the ¼ phase plate at an angle θ satisfies:

$$\pi/2 \times 0.8 < \phi < \pi/2 \times 1.2.$$

5 Claims, 6 Drawing Sheets

(PRIOR ART)

FIG. 6 ll
IMAGE DISPLAY APPARATUS HAVING PARTICULAR PHASE DIFFERENCE

BACKGROUND OF THE INVENTION

1. Field of the Invention

The present invention relates to an image display apparatus using an image display element such as a liquid crystal panel, in particular a reflective image display element.

2. Related Background Art

Figure 6:
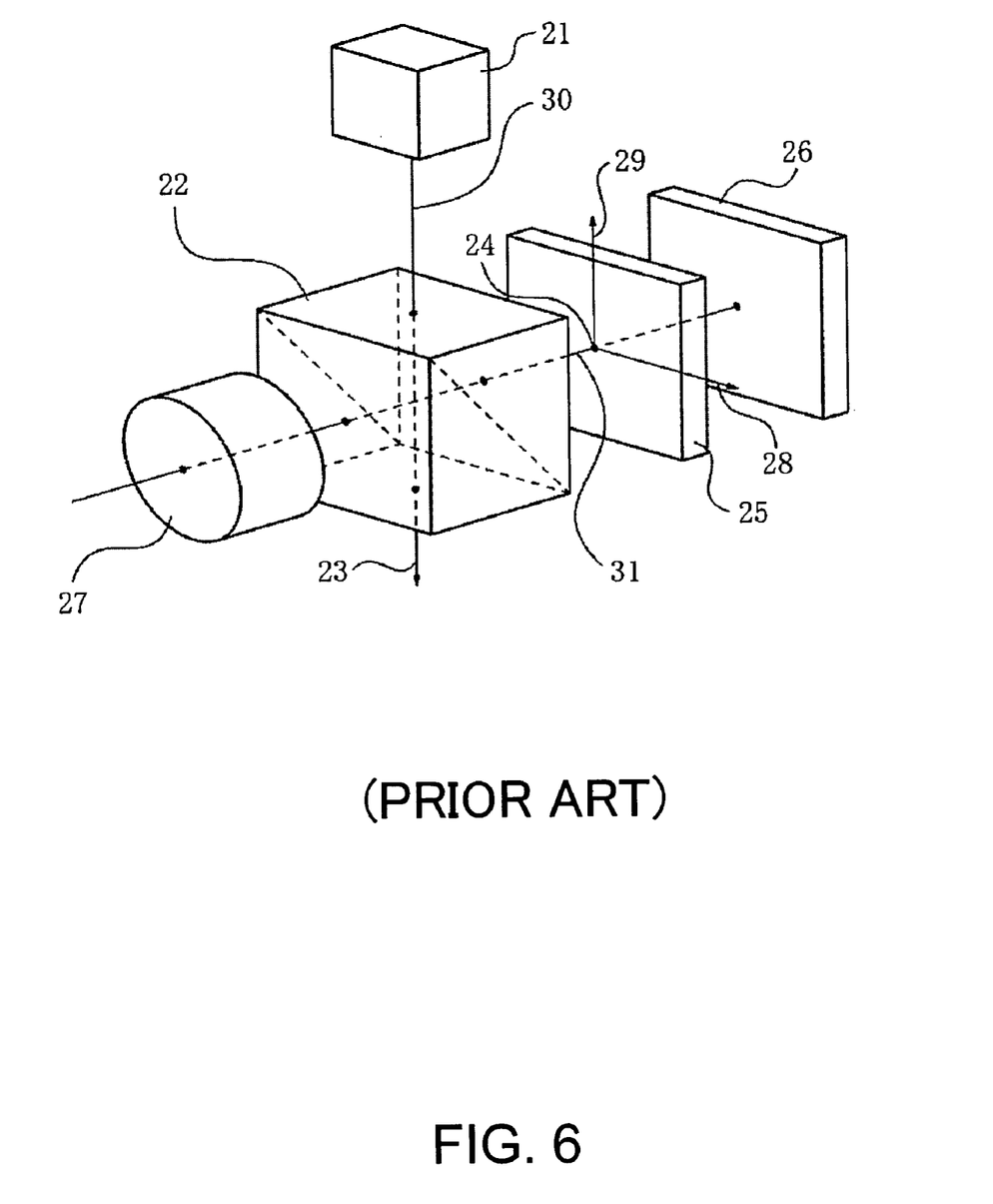
FIG. 6 is a view describing a prior art example.

U.S. Pat. No. 5,327,270 discloses an image projecting apparatus using a reflective liquid crystal display element, which is structured so that light coming from a light source is led to a reflective liquid crystal display element via a polarization beam splitter, the light reflected by the reflective liquid crystal display element is again detected and projected by the polarization beam splitter, in which a ¼ phase plate is provided between the polarization beam splitter and the reflective liquid crystal display element to compensate the contrast (FIG. 6).

In order to brighten an image projected by the image projecting apparatus, it is necessary that a luminous flux dividing system which illuminates an illumination area at a uniform illuminance and a condensing optical system including a polarization splitting system which aligns the polarization direction of the illumination light, a condenser lens which condenses a plurality of luminous fluxes emerged from the polarization splitting system, and a field lens which makes light incident into the reflective liquid crystal display element into substantially telecentric light are provided. Further, in order to improve the utilization efficiency of an illumination system having the above systems, it is necessary to make small Fno (=f/L) which is determined by a combined focal length f of the condensing optical system and an effective range width L of the condenser lens, whereby it is necessary to further make large the maximum incident angle of the luminous flux condensed at an optional one point on the reflective liquid crystal display element.

However, since the ¼ phase plate is an anisotropic structure having a predetermined thickness, the phase difference which is produced by the incident angle differs. Where light having a polarization axis which is inclined by 45° with respect to the axes of an ordinary ray and an extraordinary ray propagates in the direction of the ordinary ray in an anisotropic substance in which the refractive index of the ordinary ray is $n_o$ and the refractive index of the extraordinary ray is $n_e$, the phase difference $\phi$ of the light is expressed as follows;

$$\phi = \frac{2\pi}{\lambda}(n_o - n_e)l \quad (1)$$

where $\lambda$ is a wavelength and $l$ is a thickness of a substance in which light propagates.

Based on the expression (1), where a difference of optical paths, which is generated in the ordinary ray direction and extraordinary ray direction when light having a wavelength $\lambda$ passes through the substance is:

$$(n_0 - n_e)l = \frac{\lambda}{4}$$

the phase difference becomes:

$$\phi = \frac{\pi}{2}.$$

Therefore, the light incident as linear polarized light into the substance is converted to circular polarization and the substance is made into a ¼ phase plate.

Figure 5:
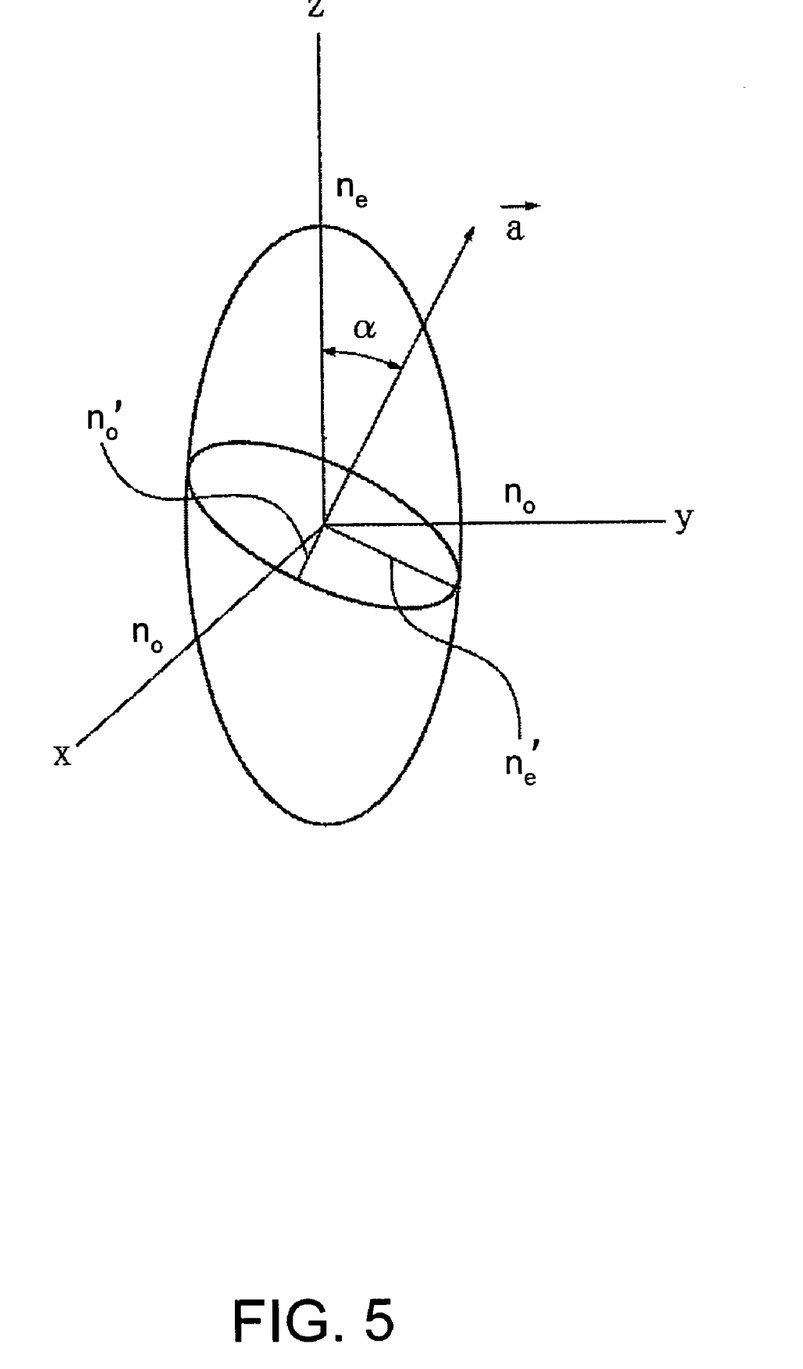
FIG. 5 is a view describing refractive indexes when light is made obliquely incident on anisotropic substance.

However, if light is made incident obliquely into the anisotropic substance, it is shown as an ellipse body having a refractive index $n_o$ in the X-axis direction and Y-axis direction and a refractive index $n_e$ in the z-axis direction as shown in FIG. 5, wherein if the propagation direction (vector a) of a wavefront is inclined by $\alpha$ on a yz plane from the extraordinary ray direction, the refractive index $n_o'$ of the ordinary ray and refractive index $n_e'$ of the extraordinary ray with respect to electric fields, which are perpendicular to each other, becomes as follows;

$$n_e' = \frac{1}{\sqrt{\frac{\cos^2\alpha}{n_o^2} + \frac{\sin^2\alpha}{n_e^2}}}$$

$$n_o' = n_o \quad (2)$$

and, the phase difference $\phi'$ of light is expressed by:

$$\phi' = \frac{2\pi}{\lambda}\left(n_o - 1 \bigg/ \sqrt{\frac{\cos^2\alpha}{n_o^2} + \frac{\sin^2\alpha}{n_e^2}}\right)\frac{l}{\sin\alpha}. \quad (3)$$

Therefore, the phase difference $\phi$ depends on the incident angle $\alpha$, wherein the incident angle with respect to the ¼ phase plate is deviated from the reference incident angle ($\alpha$=90°), and the phase difference $\phi'$ expressed by the expression (3) becomes greatly different from a value obtained by the expression (1). Then, it is not possible to obtain sufficient contrast even by using the ¼ phase plate.

SUMMARY OF THE INVENTION

In order to solve such problems, an image display apparatus according to one aspect of the invention comprises a reflective liquid crystal display element; a luminous flux dividing system which divides light from a light source into a plurality of luminous fluxes; and a condensing optical system which leads the emerged luminous fluxes from the luminous flux dividing system to the reflective liquid crystal display element. The condensing optical system includes: a condenser lens which condenses the emerged light from the luminous flux dividing system; a field lens which makes the light emerged from the condenser lens substantially telecentric with respect to the reflective liquid crystal display element; a polarization beam splitter which splits the luminous fluxes emerged from the field lens in response to the polarization state; and a ¼ phase plate which is disposed between the polarization beam splitter and the reflective liquid crystal display element. Further, the following condition is satisfied:

$$\pi/2\times0.8<\phi<\pi/2\times1.2$$

where $\pi$ represents a phase difference which the ¼ phase plate gives to a ray made incident into the ¼ phase plate at an angle $\theta$, $\theta$ is defined by :

$$\tan\theta = \frac{L}{2f}$$

where f represents a combined focal length of the condensing optical system and L represents an effective bandwidth of the condenser lens.

Also, an image display apparatus according to another aspect of the invention comprises: a first reflective liquid crystal display element, a second reflective liquid crystal display element and a third reflective liquid crystal display element which form images corresponding to a first color, a second color and a third color, respectively; a projecting optical system; a luminous flux dividing system which divides light from a light source into a plurality of luminous fluxes; a polarization converting element array which converts the plurality of respective luminous fluxes into substantially linear-polarized light; and a condensing optical system which leads the luminous fluxes from the polarization converting element array to the first reflective liquid crystal display element, the second reflective liquid crystal display element and the third reflective liquid crystal display element.

The condensing optical system includes: a condenser lens which condenses the luminous fluxes from the polarization converting element array; a field lens which makes the luminous fluxes from the condenser lens substantially telecentric with respect to the first, second and third reflective liquid crystal display elements; and a color separating optical element which separates the luminous fluxes from the field lens into light of the first and second colors and light of the third color. Further, the condensing optical system includes a first polarization beam splitter which receives the light of the first and second colors from the color separating optical element, leads the light of the first and second colors to the first and second reflective liquid crystal display element, respectively, and selectively leads image light of the light emerged from the first and second reflective liquid crystal display elements to the projection optical system; a second polarization beam splitter which receives the light of the third color from the color separating optical element, leads light of the third color to the third reflective liquid crystal display element and selectively leads image light of the light emerged from the third reflective liquid crystal display element to the projecting optical system; and a first ¼ phase plate, a second ¼ phase plate and a third ¼ phase plate which are disposed between the first and second polarization beam splitters, and the first, second and third reflective liquid crystal display elements; Then, the following condition is satisfied:

$$\pi/2 \times 0.8 < \phi < \pi/2 \times 1.2$$

where φ represents a phase difference which the ¼ phase plate gives to a ray made incident into the ¼ phase plate at an angle θ, θ is defined by:

$$\tan\theta = \frac{L}{2f}$$

where f represents a combined focal length of the condensing optical system and L represents an effective bandwidth of the condenser lens.

A detailed configuration of the image display apparatus of the invention, the above and other objects and features of the invention will be apparent from the embodiments, described below.

DESCRIPTION OF THE PREFERRED EMBODIMENTS

A brief description is given of the conditional expressions. An image display apparatus according to the present embodiment comprises: a white-color light source, a reflective liquid crystal display element which displays an image, a projecting optical system, a luminous flux dividing system which divides light from the white-color light source into a plurality of luminous fluxes, a polarization converting system (a polarization converting element array in which a plurality of polarization converting elements are arranged in a predetermined direction crossing an optical axis) which converts the plurality of divided luminous fluxes (non-polarized light) to substantially linear-polarized light, and a condensing optical system which leads the luminous fluxes from the polarization converting system to the reflective liquid crystal display element.

The condensing optical system includes a condenser lens which condenses the luminous fluxes from the polarization converting system and a field lens which makes incident light into the reflective liquid crystal display element substantially telecentric.

And, the image display apparatus according to the present embodiment further includes a polarization beam splitter, which is disposed between the reflective liquid crystal display element and the projecting optical system, which leads light from the reflective liquid crystal display elements to the projecting optical system, and a ¼ phase plate disposed between the polarization beam splitter and the reflective liquid crystal display element.

The maximum incident angle θ of a ray into the ¼ phase plate (¼ wave plate) provided between the polarization beam splitter and the reflective liquid crystal display element can be expressed to be θ=tan⁻¹(L/2f) by a combined focal length f of the condensing optical system and an effective bandwidth L of the condenser lens. Herein, the effective bandwidth L is a width of the effective band of the condenser lens in the perpendicular direction with respect to the optical axis of an illumination optical system which leads light from the light source to the reflective liquid crystal display element, wherein it is recommended that the maximum value of the effective bandwidth is employed.

Figure 4:
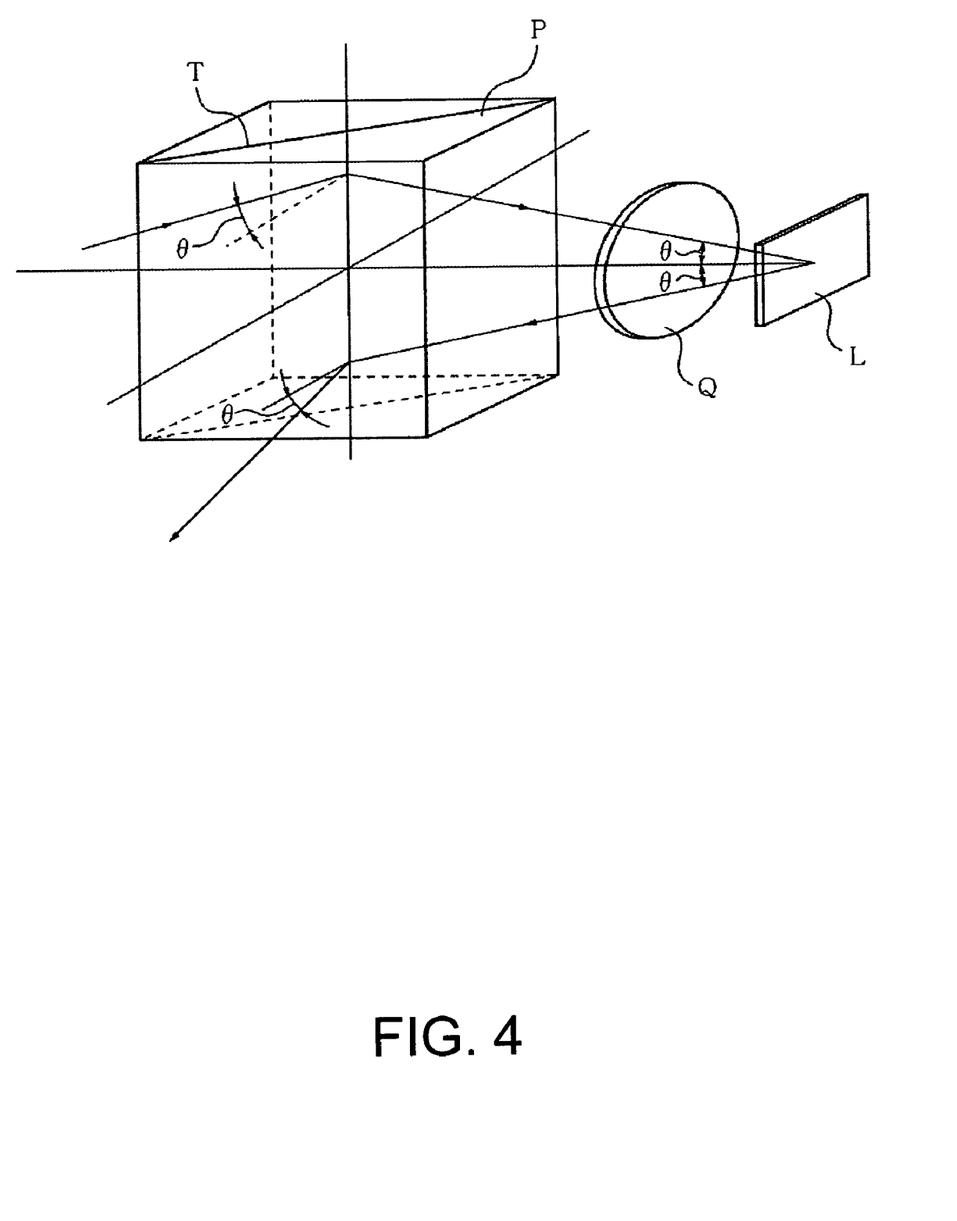
FIG. 4 is a view describing a ray made incident into the polarization beam splitter.

As shown in FIG. 4, S-polarized light made incident into the ¼ phase plate at the maximum incident angle θ is reflected by an ideal polarization separating film T of a polarization beam splitter P, is transmitted through the ¼ phase plate Q, and is made incident into the reflective liquid crystal display element L. Further, herein, θ is an angle formed by the S-polarized light with respect to the optical axis of the illumination optical system, that is, it becomes an angle which is substantially the same as the incident angle with respect to the reflective liquid crystal display element.

In addition, the light reflected by the reflective liquid crystal display element L is again transmitted through the ¼ phase plate Q and is made incident into the polarization beam splitter P. Thereby, unnecessary light other than image light is detected so that it is not led into the projecting optical system. In an optical system constructed as described above, in order to increase the utilization efficiency of light in the image display apparatus, it is recommended that the ¼ phase plate is disposed so that the phase difference φ which the ¼ phase plate gives to a ray having the maximum incident angle θ to the ¼ phase plate satisfies:

$\pi/2 \times 0.8 < \phi < \pi/2 \times 1.2$.

With such a construction, it is possible to decrease the light amount having a P component, which leaks through the polarization separating film T (that is, the light amount of a P-polarized light reflected by the polarization separating film T), of light reflected by the reflective liquid crystal display element and transmitted through the ¼ phase plate Q, wherein it becomes possible to obtain bright projection light (a projected image) having high contrast.

Further, in order to obtain an image having high contrast, if the ¼ phase plate is disposed so that the maximum emergent angle θ of luminous fluxes from the condensing optical system satisfies:

$\theta \geq 10°$, and the phase difference φ satisfies:

$\pi/2 \times 0.9 < \phi < \pi/2 \times 1.1$, it is possible to further decrease the light amount of the P component which leaks through the polarization separating film T, wherein it is possible to improve the contrast.

As a matter of course, there is no problem in that the functions similar to the above are brought about by using any optical elements other than the ¼ phase plate.

(Embodiment 1)

Figure 1:
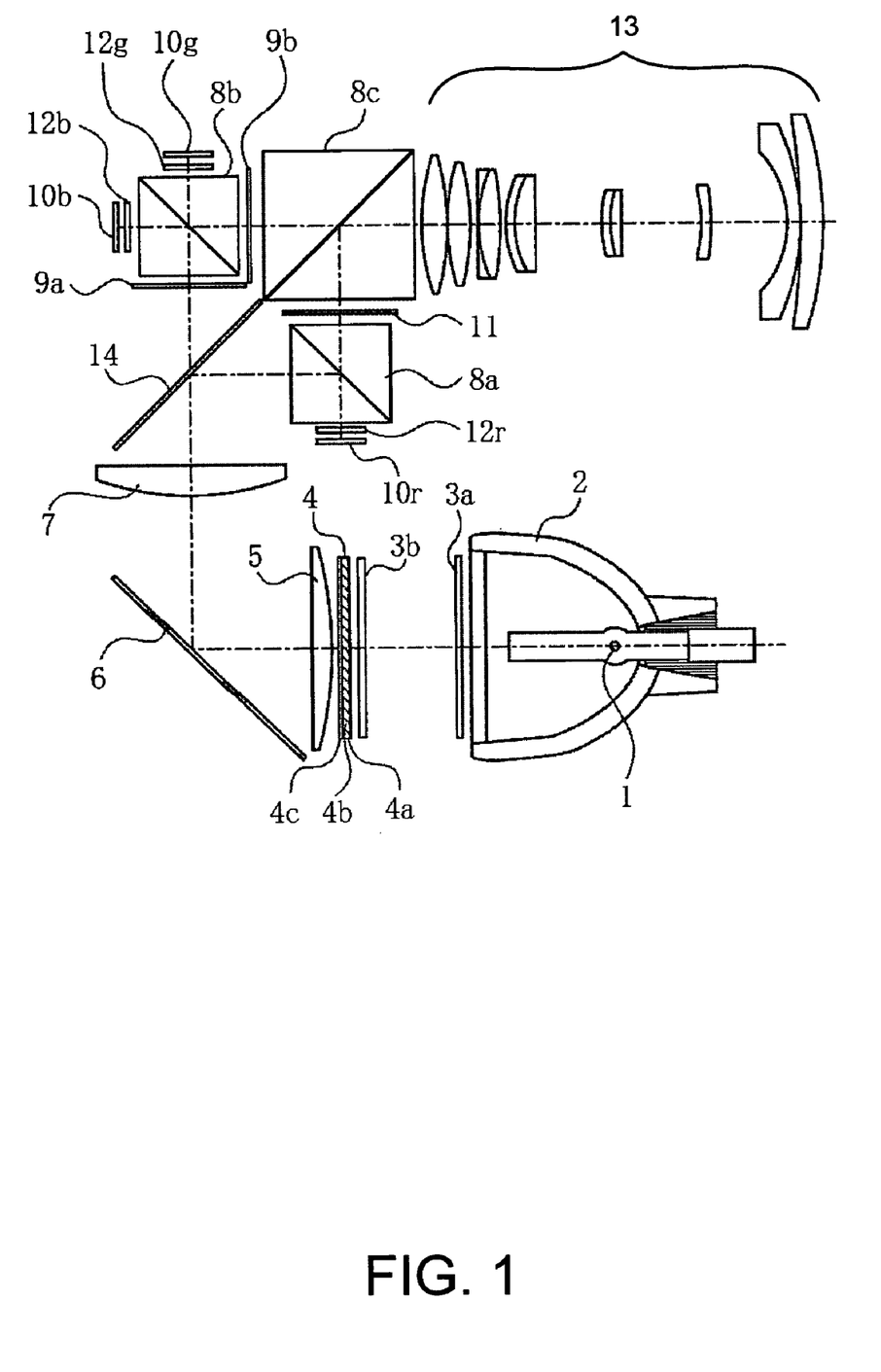
FIG. 1 is a view describing Embodiment 1.

FIG. 1 is a view describing Embodiment 1 of the present invention. In the drawing, reference numeral 1 denotes a light source consisting of a high pressure mercury lamp. Reference numeral 2 denotes a reflector which radiates light from the light source into a predetermined direction. An integrator 3 provides a uniform illumination area and is provided with fly-eye lenses 3a and 3b.

A polarization converting element 4 converts non-polarized light, which comes from the light source, to polarized light having a predetermined polarizing direction. And the polarization converting element 4 is composed of a polarization separating film 4a, a reflective film 4b and a ½ phase plate 4c. Reference numeral 5 denotes a condenser lens which condenses illumination light, reference numeral 6 denotes a mirror which leads the light from the condenser lens 5 to the illumination optical system, reference numeral 7 denotes a field lens, and reference numerals 8a, 8b and 8c denote polarization beam splitters which transmit P-polarized light and reflect S-polarized light. Color selective phase plates 9a and 9b rotate the polarization direction of only light in the green wavelength range by 90 degrees (that is, they do not rotate the polarization direction of light in red and blue wavelength ranges). Reflective liquid crystal display elements 10r, 10g and 10b display images of respective colors. Reference numeral 11 denotes a ½ phase plate, and reference numerals 12r, 12g and 12b denote a ¼ phase plate for red, a ¼ phase plate for green, and a ¼ phase plate for blue, respectively. A projecting optical system 13 may include various optical elements such as lenses, diffractive gratings, mirrors, etc. However, it is preferable that the projecting optical system 13 is composed of only lenses.

A dichroic mirror 14 transmits the light in the blue and green wavelength ranges and reflects light in the red wavelength range.

Next, a description is given of optical actions. Light emerged from the light source 1 is condensed into the direction of the fly-eye lens 3a by a reflector 2 (although, herein, a parabolic mirror is employed, it may be an elliptical mirror). The light is divided into a plurality of luminous fluxes by the fly-eye lens 3a. After that, the plurality of luminous fluxes are condensed in the vicinity of the respective fly-eye lenses 3b, are transmitted through the polarization converting element 4, and are overlapped on the reflective liquid crystal display elements 10r, 10g and 10b by actions of the condenser lens 5 and field lens 7. As a result, it is possible to illuminate the respective reflective liquid crystal display elements 10r, 10g and 10b at a uniform illumination intensity, wherein a plurality of luminous fluxes emerged from the fly-eye lenses 3b are converted to S-polarized light by the polarization converting element 4 (or may be converted to P-polarized light).

In detail, in the polarization converting element 4, the luminous fluxes are divided into P-polarized light and S-polarized light by the polarization separating film 4a corresponding to the respective luminous fluxes, wherein the S-polarized light is reflected by the reflective film 4b, and the P-polarized light is transmitted through the polarization separating film 4a, and then is converted to the S-polarized light by being transmitted through the ½ phase plate 4c. And, further, the S-polarized light converted from the P-polarized light is emerged in the same direction as that of the S-polarized light from the reflective film 4b and is finally emerged in the same direction (that is, the direction toward the condenser lens 5, in other words, the direction of the optical axis of the illumination optical system) as a predetermined polarized light (herein, as the S-polarized light).

Figure 3:
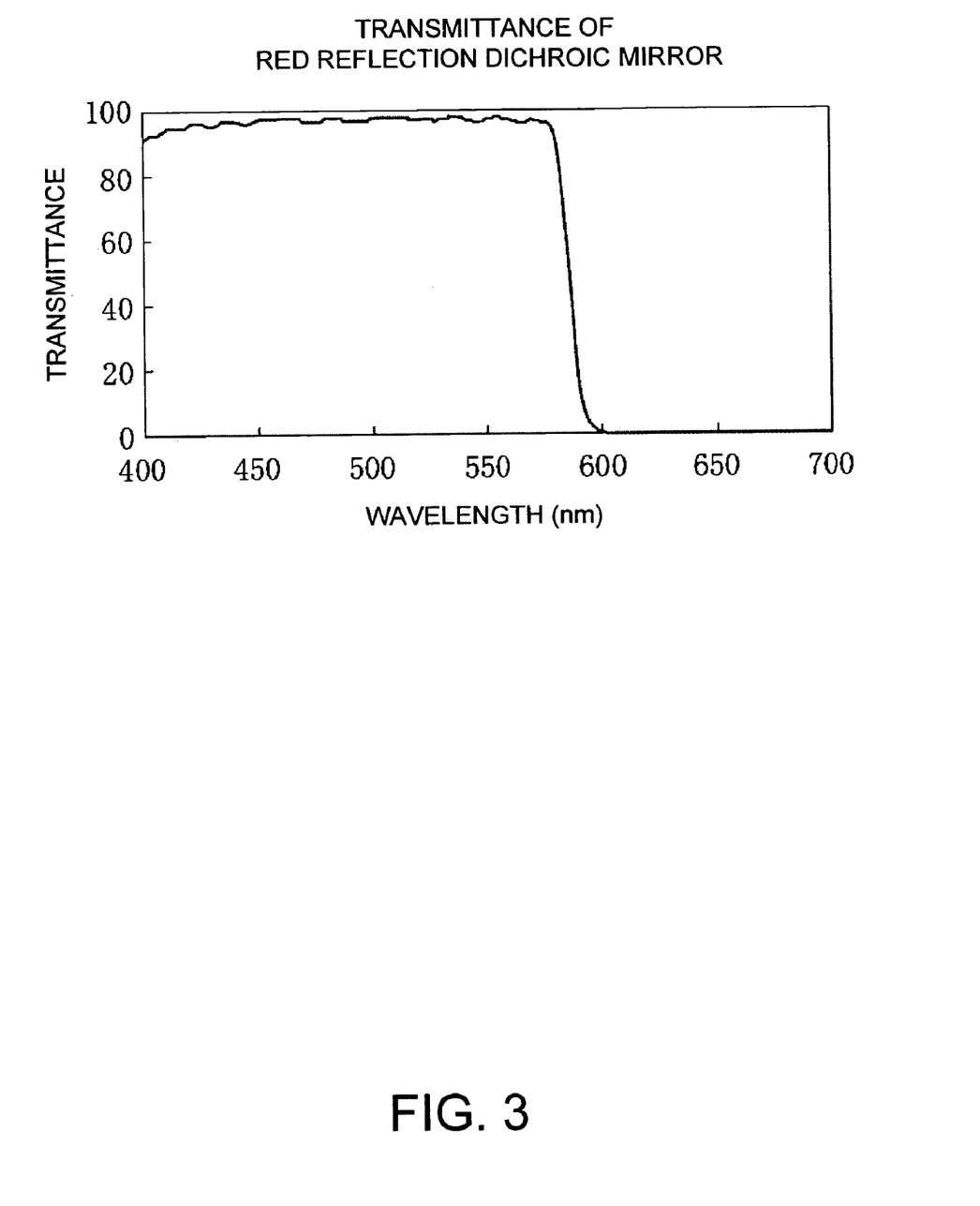
FIG. 3 is a view showing characteristics of a dichroic mirror for red reflection.

The light emerged from the polarization converting element 4 is condensed by the condenser lens 5 and field lens 7 and is made incident into the dichroic mirror 14. The dichroic mirror 14 has characteristics as shown in FIG. 3, wherein the light in the blue and green wavelength ranges is transmitted therethrough, and the light in the red wavelength range is reflected thereby. The red light that has been reflected by the dichroic mirror 14 is reflected by the polarization beam splitter 8a, is transmitted through the ¼ phase plate 12r, and is made incident into the reflective liquid crystal display element 10r. The red light made incident into the reflective liquid crystal display element 10r is image-modulated by the reflective liquid crystal display element 10r and is reflected therefrom. The image-modulated light is transmitted through the ¼ phase plate 12r again and is made incident into the polarization beam splitter 8a.

At this time, the light of the S-polarized component (black-displayed light) of the light emerged from the reflective liquid crystal display element is reflected by the polarization beam splitter 8a, returned to the light source side and is eliminated therefrom. In addition, the light of the P-polarized component (white-displayed light), which is image-modulated by the reflective liquid crystal display element is transmitted through the polarization beam splitter 8a, is led to the projecting optical system 13, and is projected on the projection surface such as a screen, etc.

At this time, it is necessary that light which is not image-modulated by the liquid crystal display element 10r (that is, light whose polarization direction is not converted by 90°) is made into S-polarized light (black-displayed light, that is, light returning to the light source direction) by the polarization separating film of the polarization beam splitter 8a. Otherwise, the contrast will be lowered. Therefore, the fast axis of the ¼ phase plate 12r provided between the polarization beam splitter 8a and the reflective liquid crystal display element 10r is adjusted (compensated) in a predetermined direction, whereby disturbance in the polarization state, which may occur in the polarization beam splitter 8a and the reflective liquid crystal display element 10r, can be suppressed to be low.

In detail, in a case where, when light is made incident into the polarization beam splitter at an angle other than the predetermined angle (herein, 45°), light of a component differing from the S-polarized component is reflected, this becomes a cause of lowering the contrast. Therefore, with respect to the light made incident into the polarization beam splitter at an angle other than 45°, only the light which is image-modulated by the reflective liquid crystal display element is substantially led into the projecting optical system as image light. It is necessary to establish the direction of the fast axis of the ¼ phase plate so that the contrast is further increased than at least in a case where no ¼ phase plate is disposed.

The light which is image-modulated by the reflective liquid crystal display element 10r and is made incident into the polarization beam splitter 8a as P-polarized light is transmitted through the polarization beam splitter 8a, and its polarization direction is converted by 90° by the ½ phase plate 11, and is made into S-polarized light. And, it is made incident into the polarization beam splitter 8c and is reflected by the polarization beam splitter 8c, whereby the light is led to the projecting optical system 13 and is thus projected.

S-polarized blue and green light transmitted through the dichroic mirror 14 is made incident into the color selective phase plate 9a which converts the polarization direction by 90° only with respect to the light in the green wavelength range, wherein the polarization direction in the blue wavelength range is not converted, and the blue light is made incident into the polarization beam splitter 8b as S-polarized light. The polarization direction in the green wavelength range is converted and the green light is made incident into the polarization beam splitter 8b as P-polarized light.

The polarization beam splitter 8b carries out color separation by reflecting light in the blue wavelength range, which is S-polarized light, and transmitting light in the green wavelength range, which is P-polarized light. The light in the blue wavelength range, which is reflected by the polarization beam splitter 8b, is transmitted through the ¼ phase plate 12b and is made incident into the reflective liquid crystal display element 10b. The P-polarized component (the component whose polarization direction is changed by the reflective liquid crystal display element 10b) of the light emerged from the reflective liquid crystal display element 10b is again transmitted through the ¼ phase plate 12b, further transmitted through the polarization beam splitter 8b and polarization beam splitter 8c, and is projected on a projection surface by the projecting optical system 13.

The S-polarized component (the component whose polarization direction is not changed by the reflective liquid crystal display element 10b) of the light emerged from the reflective liquid crystal display element 10b is reflected by the polarization beam splitter 8b, is returned to the light source side, and is eliminated therefrom.

Also, the light in the green wavelength range, which is transmitted through the polarization beam splitter 8b, is further transmitted through the ¼ phase plate 12g, and is made incident into the reflective liquid crystal display element 10g. The S-polarized component (the component whose polarization direction is changed by the reflective liquid crystal display element log) of the light emerged from the reflective liquid crystal display element 10g is again transmitted through the ¼ phase plate 12g, is reflected by the polarization beam splitter 8b, and is led to the projecting optical system 13.

The P-polarized component (the component whose polarization direction is not changed by the reflective liquid crystal display element 10g) of the light emerged from the reflective liquid crystal display element 10g is transmitted through the polarization beam splitter 8b, returned to the light source side, and is eliminated therefrom. That is, the light is shielded from the projecting optical system 13.

The P-polarized light in the blue range and S-polarized light in the green range, which are projection light components emerged from the polarization beam splitter 8b, are made incident into the color selective phase plate 9b which converts only the polarization direction in the green wavelength range by 90°. Since the polarization direction of the blue wavelength range is not converted, the blue light remains to be P-polarized light. The polarization direction of the green wavelength range is converted and the green light becomes P-polarized light. The light in the blue and green wavelength ranges is transmitted through the polarization beam splitter 8c, wherein the light is led to the projecting optical system 13 and is projected therefrom.

At this time, the fast axes of the ¼ phase plates 12g and 12b, which are provided between the polarization beam splitter 8b and the reflective liquid crystal display elements 10g and 10b, are compensated, and black display is adjusted as the ¼ phase plate 12r used in the red optical path.

Herein, as a matter of course, excepting the ½ wave plate (phase plate) 11 that rotates the polarization direction of the red component, a color selective phase plate that converts the polarization direction of the light in the blue wavelength range by 90° and has characteristics by which the polarization direction of the light in the green wavelength range is not changed may be disposed instead of the color selective phase plate 9b, and the disposing position of the projecting optical system 13 may be changed to the upper side of the polarization beam splitter 8c in FIG. 1 (that is, the beam splitters 8a and 8c, and the projecting optical system 13 are disposed to be almost aligned with each other).

Figure 2:
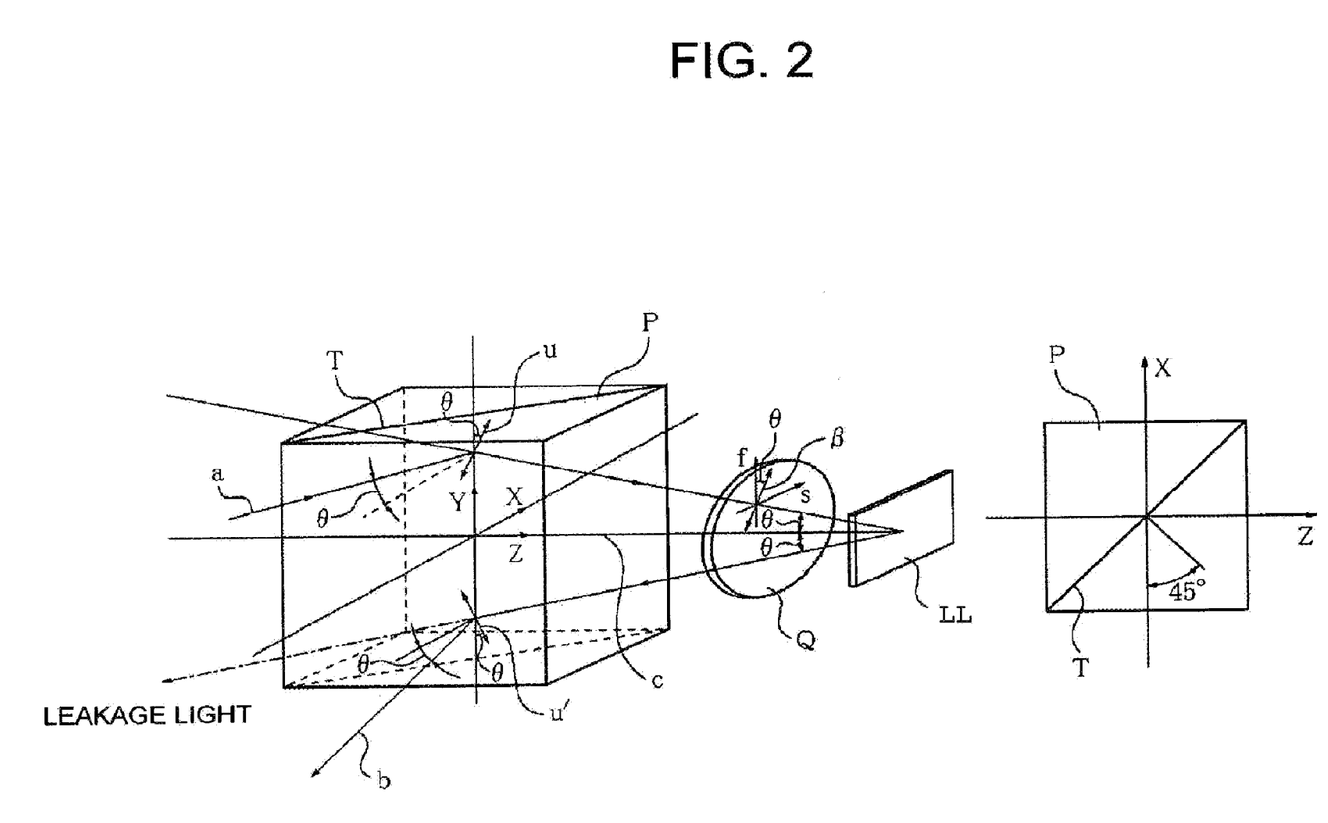
FIG. 2 is a view expressing the polarization axis direction of light made incident into a ¼ phase plate according to Embodiment 1.

Here, after the light made incident into the polarization beam splitters 8a and 8b at the incident angle θ is transmitted through the ¼ phase plates 12r, 12g and 12b which gives a phase difference φ to a ray having the incident angle θ and is reflected by the reflective liquid crystal display elements 10r, 10g and 10b, when the light is transmitted through the ¼ phase plates 12r, 12g and 12b again and is transmitted through (or reflected by) the polarization beam splitters 8a and 8b, the leakage light amount becomes as shown in FIG. 2 if it is expressed by using an ideal polarization beam splitter P which transmits all of the P-polarized light and reflects all of the S-polarized light and an ideal reflective liquid crystal display element LL in which the polarization state of reflecting light is not changed.

Here, the leakage light amount means the amount of light that is reflected although it must be transmitted. Of course, there is no problem even if transmission and reflection are inverted. In further detail, the leakage light amount means the amount of light, which is reflected by the polarization beam splitter, of the light that is modulated by the reflective liquid crystal display element, converted to image light to be projected on a projection surface such as a screen, etc., and is inherently transmitted through the polarization beam splitter and is about to be led into the projecting optical system.

In FIG. 2, the optical axis of light made incident into the polarization separating film T of the polarization beam splitter P at an angle of 45° is defined as an X-axis, the axial direction of a ray "c", which is reflected by the polarization beam splitter P and is made incident into the ¼ phase plate Q and the reflective liquid crystal display element LL vertically, is defined as a Z axis, and the axis perpendicular to the X axis and Z axis is defined as a Y axis. An S-polarized incident ray "a" made incident into the reflective liquid crystal display element LL in the XY plane at an incident angle θ is reflected by the polarization beam splitter P, transmitted through the ¼ phase plate Q in which the fast axis of vector f' (the vector s' in the slow axis direction is orthogonal to the vector f') is in the Y-axis direction, and is made incident into the reflective liquid crystal display element LL.

Further, a ray "b" which is reflected in the symmetrical direction of the Z axis by the reflective liquid crystal display element LL is transmitted through the ¼ phase plate Q again and is detected by the polarization beam splitter. At this time, if the ratio of the incident light intensity $I_o$ of the incident ray "a" to the light intensity $I_p$ of the P-polarized component which leaks without being detected by the polarization beam splitter P, of the ray b reflected by the black-displayed reflective liquid crystal display element LL is expressed in terms of a Jones vector, the S-polarized direction with respect to the Y axis is inclined by θ rightward in the XY plane since the S-polarized incident ray "a" is reflected by the polarization separating film T of the polarization beam splitter P. Therefore, the polarization axis β of the ray made incident into the ¼ phase plate Q is inclined by θ in the f's' plane.

Further, the incident ray "a" is reflected by the black-displayed reflective liquid crystal display element LL in the symmetrical direction of the Z axis on the YZ plane without changing the polarization state and is made incident into the ¼ phase plate Q at an incident angle θ. At this time, the ¼ phase plate has a phase difference determined by the incident angle. In the case where the phase difference of the ¼ phase plate Q at the incident angle θ is φ, since the ray "a" is transmitted through the ¼ phase plate Q twice at the same incident angle θ, the Jones vector A of the ¼ phase plate becomes:

$$A = \begin{pmatrix} \exp\left(\frac{i2\phi}{2}\right) & 0 \\ 0 & \exp\left(\frac{-i2\phi}{2}\right) \end{pmatrix}. \quad (4)$$

Also, since the polarization axis β made incident into the ¼ phase plate Q is inclined by θ with respect to the fast axis f' of the ¼ phase plate Q, the Jones vector A' (φ, θ) of the ¼ phase plate Q is expressed to be $$A'(\phi, \theta) = A_\theta A A_{-\theta} \quad (5)$$

by coordinate-transforming the expression (4) on the basis of the following rotating matrix:

$$A_\theta = \begin{pmatrix} \cos\theta & -\sin\theta \\ \sin\theta & \cos\theta \end{pmatrix}$$

Also, if the ray "a" made incident into the polarization beam splitter P is expressed by the Jones vector:

$$\begin{pmatrix} 1 \\ 0 \end{pmatrix}$$

of linear polarization, the Jones vector $$\begin{pmatrix} E_x \\ E_y \end{pmatrix}$$

of the ray "b" that has been transmitted through the ¼ phase plate twice, can be expressed to be:

$$\begin{pmatrix} E_x \\ E_y \end{pmatrix} = A_\theta A A_{-\theta} \cdot \begin{pmatrix} 1 \\ 0 \end{pmatrix}. \quad (6)$$

Here, since the direction (vector u) of S-polarization on the polarization separating film T of the incident ray a is rotated by 2θ with respect to the direction (vector u') of S-polarization on the polarization separating film T of the ray "b", by using a rotating matrix $P_\theta$, $$P_\theta = \begin{pmatrix} \cos 2\theta & -\sin 2\theta \\ \sin 2\theta & \cos 2\theta \end{pmatrix}. \quad (7)$$

The Jones vector $P_\delta$ for detecting the S component on the polarization separating film T is expressed to be:

$$P_\delta = P_\theta \begin{pmatrix} 1 & 0 \\ 0 & 0 \end{pmatrix} P_{-\theta} = \begin{pmatrix} \cos^2 2\theta & \sin 2\theta \cos 2\theta \\ \sin 2\theta \cos 2\theta & \sin^2 2\theta \end{pmatrix}. \quad (8)$$

Therefore, the Jones vector of the ray "b" (Expression (6)) which has been made incident into the polarization beam splitter P, detected in terms of S by the polarization separating film T of the polarization beam splitter P and emerged from the film T:

$$\begin{pmatrix} E_x \\ E_y \end{pmatrix}$$

is expressed to be $$\begin{pmatrix} E_x \\ E_y \end{pmatrix} = P_\delta \cdot A'(\phi, \theta) \cdot \begin{pmatrix} 1 \\ 0 \end{pmatrix} \qquad (9)$$

$$= \begin{pmatrix} \cos^2 2\theta \cdot \cos\left(\frac{2\phi}{2}\right) + i\cos 2\theta \cdot \sin\left(\frac{2\phi}{2}\right) \\ \sin 2\theta \cdot \cos 2\theta \cdot \cos\left(\frac{2\phi}{2}\right) + i\sin 2\theta \cdot \sin\left(\frac{2\phi}{2}\right) \end{pmatrix}.$$

The light intensity $I_s$ of the S-polarized component detected by the polarization beam splitter P is:

$$I_s = E_x \cdot E_x^* + E_y \cdot E_y^* \qquad (10)$$

and in a case where the intensity of the incident ray "a" is $I_o$, the light intensity $I_s$ can be expressed as follows:

$$I_s = I_0 \left( \cos^2 2\theta + \sin^2 2\theta \cdot \sin^2\left(\frac{2\phi}{2}\right) \right). \qquad (11)$$

Also, the light intensity $I_p$ of the P-polarized component detected by the polarization beam splitter can be expressed as follows;

$$I_p = I - I_s.$$

Here, if the F number (Fno) is 2, the maximum angle of the ray is 14°, and since the polarization axis of the incident ray "a" having the maximum incident angle 14° and being made incident into the ¼ phase plate Q is inclined by 14° with respect to the fast axis of the ¼ phase plate Q, $\theta=14°$ is established. In addition, in a case where the phase difference $\phi$ of the ¼ phase plate for the incident ray at 14° is $\phi=\pi/2\times1.2(=108°)$, and the incident intensity is $I_o=1$, the intensity in the S-polarized direction is $I_s=0.979$, and the intensity in the P-polarized direction is $$I_p = 0.021 \qquad (12),$$

the ratio in the intensity $I_o/I_p$ of the incident light and the P-polarized component is:

$$I_o/I_p = 47.6 \qquad (13).$$

Also, similarly, when the phase difference $\phi$ of the ¼ phase plate is $\phi=\pi/2\times0.8$ (=72°), the intensity ratio $I_o/I_p$ between the incident light and the P-polarized component is:

$$I_o/I_p = 47.6 \qquad (14).$$

It is recommended that the ratio of the light intensity $I_p$ of the ray, having an incident angle ($\theta$) 140°, leaking from the polarization beam splitter P and the intensity $I_o$ of the incident ray in the optical system shown in FIG. 2 becomes more than values expressed in the Expressions (13) and (14).

At this time, if the ¼ phase plates 12r, 12g and 12b, which are provided between the polarization beam splitters 8a and 8b and the reflective liquid crystal display elements 10r, 10g and 10b satisfy:

$$\pi/2\times0.8 < \phi < \pi/2\times1.2$$

in the maximum angle ($\theta$) 14° of luminous fluxes in the condensing optical system at which the phase difference $\phi$ of the ¼ phase plate is capable of increasing the utilization efficiency of the illumination optical system in the respective wavelength ranges (the wavelength range of red is 590 through 650 nm, the wavelength range of green is 500 through 590 nm, and the wavelength range of blue is 430 through 500 nm), it is possible to project an image having high contrast.

According to such an embodiment, since the incident angle characteristics of the ¼ phase plate are improved, adequate compensation can be carried out with respect to a bright image illumination system, and it is possible to achieve a bright projection apparatus having high contrast.

While preferred embodiment has been described, it is to be understood that modification and variation of the present invention may be made without departing from the scope of the following claims.

This application claims priority from Japanese Patent Application No. 2003-208413 filed on Aug. 22, 2003, which is hereby incorporated by reference herein.

What is claimed is:

1. An image display apparatus comprising:
   a reflective liquid crystal display element;
   a luminous flux dividing system which divides light from a light source into a plurality of luminous fluxes; and
   a condensing optical system which leads the emerged luminous fluxes from the luminous flux dividing system to the reflective liquid crystal display element,
   wherein the condensing optical system comprises:
   a condenser lens which condenses the emerged luminous fluxes from the luminous flux dividing system;
   a field lens which makes the emerged luminous fluxes from the condenser lens substantially telecentric with respect to the reflective liquid crystal display element;
   a polarization beam splitter which splits the luminous fluxes emerged from the field lens in response to the polarization state; and
   a ¼ phase plate which is disposed between the polarization beam splitter and the reflective liquid crystal display element; and
   the following condition is satisfied:

$\pi/2\times0.8 < \phi < \pi/2\times1.2$ where $\phi$ represents a phase difference which the ¼ phase plate gives to a ray having the largest incident angle on the ¼ phase plate among rays excluding 0° made incident into the ¼ phase plate.

2. The image display apparatus according to claim 1, wherein the following condition is satisfied:

$\pi/2\times0.9 < \phi < \pi/2\times1.1$.

3. The image display apparatus according to claim 1, further comprising:
   three reflective liquid crystal display elements corresponding to a red wavelength range, a green wavelength range and a blue wavelength range, respectively, and
   a projecting optical system which projects light from the three reflective liquid crystal display elements onto a projection surface.

4. An image display apparatus comprising:
   a first reflective liquid crystal display element, a second reflective liquid crystal display element, and a third reflective liquid crystal display element which form images corresponding to a first color, a second color and a third color, respectively;
   a projecting optical system;
   a luminous flux dividing system which divides light from a light source into a plurality of luminous fluxes;
   a polarization converting element array which converts the plurality of luminous fluxes into substantially linear-polarized light; and a condensing optical system which leads the luminous fluxes from the polarization converting element array to the first, second and third reflective liquid crystal display elements;

wherein the condensing optical system comprises:

a condenser lens which condenses the luminous fluxes from the polarization converting element array;

a field lens which makes the luminous fluxes from the condenser lens substantially telecentric with respect to the first, second and third reflective liquid crystal display elements;

a color separating optical element which separates the luminous fluxes from the field lens to light of the first and second colors and light of the third color;

a first polarization beam splitter which receives the light of the first and second colors from the color separating optical element, leads the light of the first and second colors to the first and second reflective liquid crystal display elements, respectively, and selectively leads image light of the light emerged from the first and second reflective liquid crystal display elements to the projecting optical system;

a second polarization beam splitter which receives the light of the third color from the color separating optical element, leads the light of the third color to the third reflective liquid crystal display element, and selectively leads image light of the light emerged from the third reflective liquid crystal display element; and a first ¼ phase plate, a second ¼ phase plate and a third ¼ phase plate which are disposed between the first and second polarization beam splitters and the first, second and third reflective liquid crystal display elements; and wherein the following condition is satisfied:

$\pi/2 \times 0.8 < \phi < \pi/2 \times 1.2$ where $\phi$ represents a phase difference which the ¼ phase plate gives to a ray having the largest incident angle on the ¼ phase plate among rays excluding 0° made incident into the ¼ phase plate.

5. The image display apparatus according to claim 4, wherein the following condition is satisfied:

$\pi/2 \times 0.9 < \phi < \pi/2 \times 1.1$.

* * * * *